T. R. DU BOIS.
DYNAMO ELECTRIC MACHINE.
APPLICATION FILED APR. 22, 1916. RENEWED FEB. 11, 1919.

1,318,853.  
Patented Oct. 14, 1919.
2 SHEETS—SHEET 1.

Witnesses  
David H Tinkler  
Ralph Munden

Inventor  
Thomas R. Du Bois  
By Raymond H. Van Vleet.  
Attorney

T. R. DU BOIS.
DYNAMO ELECTRIC MACHINE.
APPLICATION FILED APR. 22, 1916. RENEWED FEB. 11, 1919.

1,318,853.

Patented Oct. 14, 1919.
2 SHEETS—SHEET 2.

Witnesses
David H. Tinkler
Ralph Munden

Inventor
Thomas R. DuBois
By Raymond H. Van Vleet
Attorney

UNITED STATES PATENT OFFICE.

THOMAS R. DU BOIS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,318,853.　　　　Specification of Letters Patent.　　Patented Oct. 14, 1919.

Application filed April 22, 1916, Serial No. 92,955. Renewed February 11, 1919. Serial No. 276,424.

*To all whom it may concern:*

Be it known that I, THOMAS R. DU BOIS, a citizen of the United States, residing at Niagara Falls, in the county of Niagara and State of New York, have invented new and useful Improvements in Dynamo-Electric Machines, of which the following is a specification.

The present invention relates to dynamo-electric machines.

More particularly the present invention relates to that class of dynamo electric machines for use with internal combustion engines and storage batteries in which systems the dynamo electric machine supplies the motive power for starting the internal combustion engine and, when driven by said engine, sets up the electro-motive force required to charge the storage battery and supply the lights.

The starting of an internal combustion engine by an electric motor requires for a brief period a dynamo electric machine having the capacity of receiving a considerable amount of electrical energy from the storage battery or other source, while the lighting and recharging apparatus requires, for a much longer period of time, a machine capable of delivering a very much smaller amount of electrical energy.

An object of the present invention is to provide a dynamo electric machine which may be readily converted from a motor to a generator and which is especially adapted to the peculiar conditions of automobile starting and lighting apparatus.

A further object is to provide a dynamo electric machine of the double armature type which is cheap to manufacture and is provided with a minimum of coils.

A further object is to provide a dynamo electric machine of the engine starting type which is inherently regulated to maintain the generating current within safe limits.

A further object is to provide an automobile starting and lighting system which is simple and reliable in operation.

Other objects will appear as the description proceeds.

Referring to the drawings:—

Figure 1:
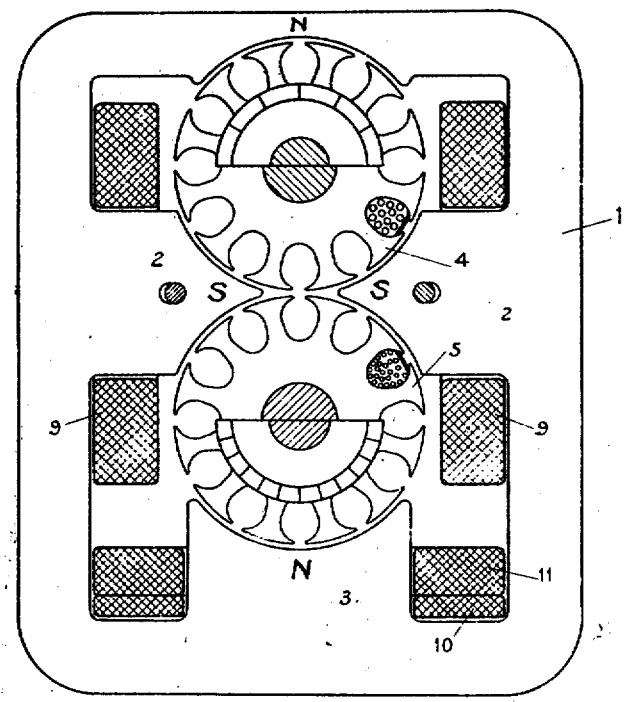
Figure 1 shows a cross-sectional view of a double armature dynamo electric machine.
Figures 2, 3:
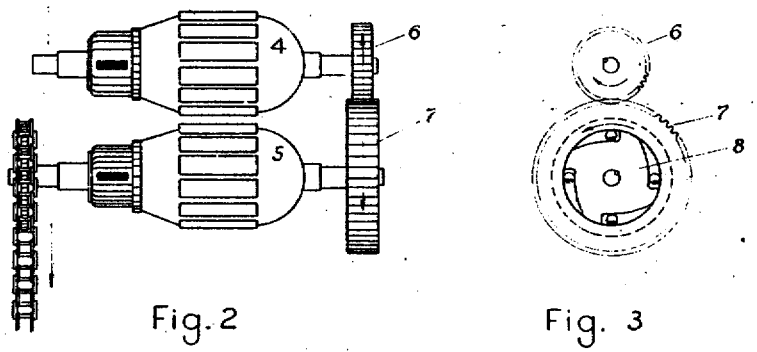
Fig. 2 shows the two armatures with gearing which may be used therebetween.
Fig. 3 shows another view of the gearing.

Referring first to Fig. 1, the field frame is represented as a whole by the numeral 1. Extending inwardly from the sides of said frame are two pole pieces 2, while extending up from the bottom of said frame is a pole piece 3. Mounted to rotate in bearings (not shown) are two armatures 4 and 5. These armatures are associated with the pole pieces as indicated in the drawing. Armature 4 is provided with a few turns of relatively heavy wire, while armature 5 is provided with a much greater number of turns of relatively fine wire. Connected to the shaft of armature 4 is a pinion 6 adapted to mesh with the gear 7 which is associated with the shaft of armature 5 through an overrunning clutch, 8, which may be of any of the well known types. The function of the overrunning clutch is to connect the armatures 4 and 5 together while motoring, whereby they will act cumulatively to produce a high torque, but to permit the armature 5 to run free of the armature 4 under generating conditions, as will be explained more in detail later. Though the two armatures are shown as coöperating through an overrunning clutch, it is to be understood that the present invention is independent of the overrunning clutch, the latter being disclosed merely for the reason that it is a well known device and is therefore convenient in explaining the invention. Any construction may be used which will operate to connect the two armatures together or to a common operating member during the motoring period and which will permit the armature 5 to run free of armature 4 during the generating period.

Figure 4:
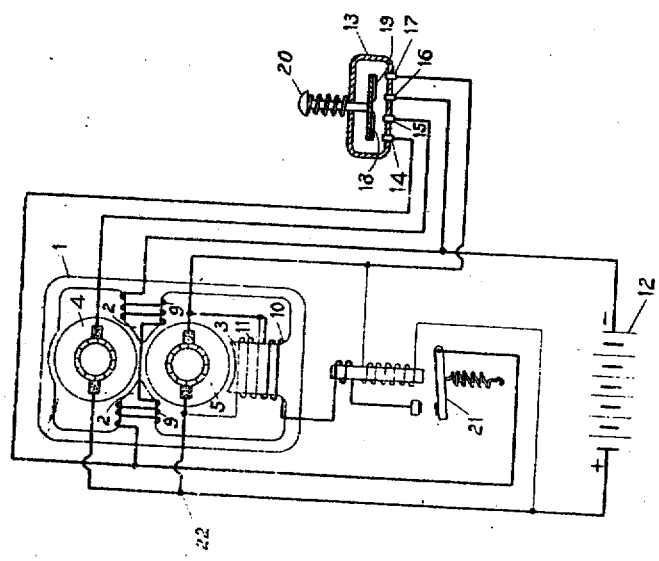
Fig. 4 shows a wiring diagram according to the present invention.

Referring now to Fig. 4, which represents one embodiment of the present invention, the pole pieces 2 are provided with windings 9, 9, while pole piece 3 is provided with a winding 10 and a shunt winding 11. A storage battery is represented at 12 and a switch casing at 13. Said switch casing is shown as provided with four stationary contacts 14, 15, 16 and 17, of which 14 and 15 are adapted to be bridged by movable contact 18, while 16 and 17 are adapted to be bridged by movable contact 19. Contacts 18 and 19 are mounted to move together upon movement of the spring-pressed manually operated member 20. The circuit connections established when said manually operated member is moved will be described hereinafter. An automatic switch 21, which may be of any preferred construction, is provided in one of the leads between the armature 5 and the storage battery 12.

As shown in Fig. 4 the dynamo-electric machine is not operating. When the operator desires to start the engine, (not shown) he will move the member 20, thus bridging contacts 14 and 15 by means of the contact 18, and also bridging contacts 16 and 17 by means of contact 19. Circuit may now be traced from the left hand side of the storage battery to the point 22, whence branch circuits lead through armature 4 and armature 5. The branch circuit through armature 4 may be traced contacts 15, 18 and 14 through the series winding 9, back to the battery. At this time, it will be noted, the automatic switch 21 is open. The branch circuit through armature 5 may be traced through contacts 17, 19 and 16 back to the battery. A small amount of current will be diverted around armature 5 through the shunt coil 11. The series coils 9, 9, are wound to direct the flux through armature 4 and through armature 5 and pole piece 3. The shunt coil 11 tends to increase the flux through armature 5, but in practice, due to the preponderance of the series coils and due to the greater length of flux path due to the length of pole piece 3, the effect of this shunt coil is almost negligible. It will be observed that the top part of the field magnet frame constitutes a consequent pole for the armature 4. The two armatures will rotate and, being mechanically connected, either together or to a common member, they will act cumulatively to produce a high torque for starting purposes.

Armatures 4 and 5 are so designed that when motoring the C. E. M. F. generated in each armature is less than the voltage impressed across the brushes. Therefore, there will be no interchange of current between the armatures. For this purpose the machine is constructed with the ratio of the number of active conductors in the two armatures in inverse proportion to the speed ratio of said armatures. As the magnetic field acts substantially equally on both armatures, it will be obvious that by the above arrangement and construction, the same field flux is cut by the same number of conductors per given period of time.

When the engine has been started, the operator will release the member 20, whereby circuit will be opened at contacts 14, 15, 16 and 17, disconnecting the battery from the dynamo electric machine. Armature 4 will be disconnected from the engine as explained above, but armature 5 will be rotated by same. When armature 5 develops a voltage sufficient to charge the storage battery, the automatic switch 21 will close. Circuit may now be traced from armature 5 through the storage battery, series winding 9, automatic switch 21, series winding 10, back to the armature 5.

Coils 9 and 10 are connected to set up an opposing action to the flux developed by the shunt coil 11. Consequently the current delivered by the machine will be held to a safe value.

Figure 5:
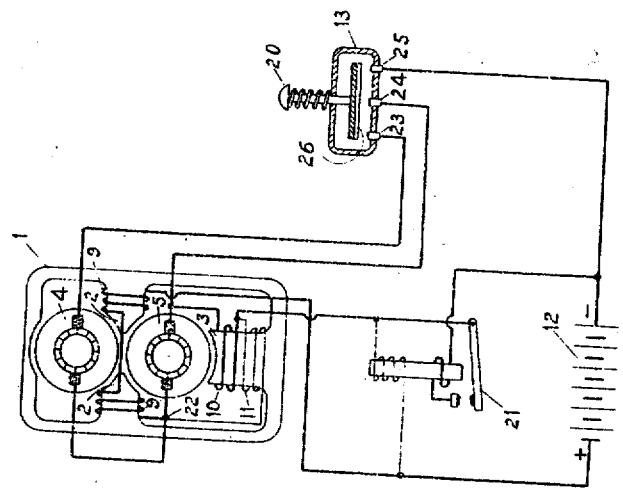
Fig. 5 shows a slightly modified wiring diagram according to the present invention.

Referring now to Fig. 5, the dynamo electric machine therein disclosed is similar in most respects to that disclosed in Fig. 4, but there are some differences in the connections of the various windings. The pole pieces 2, 2, are supplied with series windings 9, 9, as in Fig. 4. A series winding 10 and an automatic switch 21 are also provided in a lead between the armature 5 and the battery 12. The shunt coil 11 is connected across the armature 5 through the series coil 10, said coils 10 and 11 being reversely wound. The switch casing 13 is provided with three stationary contacts, 23, 24 and 25 and with one bridging contact 26, normally spring held away from said stationary contacts.

When the operator desires to start the engine (not shown) in the arrangement shown in Fig. 5, he will move the member 20, thus bridging contacts 23, 24 and 25. Circuit may now be traced from the left hand side of the battery through the series coils 9, 9, to the point 22, whence branch circuits may be traced through armature 4 to contact 23 and through armature 5 to contact 24. From these contacts, circuit may be traced through bridging contact 26 and stationary contact 25, back to the battery. At this time the automatic switch 21 will be open. A small amount of current will be directed around armature 5 through the differentially wound coils 11 and 10. Inasmuch as the coil 11 will be wound with a large number of turns, while coil 10 will be wound with comparatively few turns, coil 11 will predominate. It will be clear that flux through pole pieces 2, 2, will divide, part threading through armature 4 and the remainder through armature 5. The predominating influence of coil 11 will tend to increase the flux through armature 5, but in practice, due to the preponderance of the series coils and due to the greater length of the flux path due to the length of pole piece 3, the preponderating effect of shunt coil 11 is almost negligible. The armatures 4 and 5 will therefore coöperate as described in connection with Fig. 4 to exert a high torque. The armatures are designed, as described in connection with Fig. 4, to prevent an exchange of current therebetween.

When the engine has been started, the operator will release the member 20, whereby circuit will be opened at contacts 23, 24 and 25, disconnecting the battery from the dynamo-electric machine. The engine will drive armature 5 but armature 4 will be disconnected from said engine as explained above. When armature 5 develops a sufficient voltage to charge the storage battery, the automatic switch will close and current will be delivered from armature 5 through the series coils 9, 9, battery 12, automatic switch 21, series coil 10, back to armature 5. Series coils 9, 9, and 10 will set up opposing influences to shunt coil 11 and will limit the current output of the machine to a safe value.

Two embodiments of the present invention have been described in detail. Many modifications may be made in the embodiments disclosed. It is intended to include in this case all such modifications that fall within the scope of the invention as defined by the appended claims.

Having described my invention, what I claim as new and desire to secure by Letters Patent of the United States, is:—

1. In a dynamo electric machine, a pair of rotatable armatures, a field frame having opposed pole pieces for supplying flux to said armatures, a third pole piece associated with one of said armatures and adapted under certain circumstances to oppose and overcome the flux supplied by said opposed pole pieces.

2. In a dynamo electric machine, a pair of rotatable armatures, means symmetrically arranged with respect to said armatures for supplying flux thereto, means responsive to the voltage developed across one of said armatures for supplying flux thereto, said last mentioned means being adapted, under certain circumstances to oppose and overcome the flux from said symmetrically arranged means through said one armature.

3. In a dynamo electric machine, a pair of rotatable armatures, means symmetrically arranged with respect to said armatures for supplying flux thereto in parallel paths, means responsive to the voltage developed across one of said armatures for supplying flux thereto, said last mentioned means being adapted, under certain circumstances, to oppose and overcome the flux from said symmetrically arranged means through said one armature.

4. In a dynamo electric machine, a pair of rotatable armatures, series field coils for supplying flux to said armatures in parallel paths, a shunt wound coil for supplying flux to one of said armatures, a series coil connected with said shunt wound coil, said series coil being wound to oppose the effect of said shunt coil during certain stages of operation.

5. In a dynamo electric machine, a pair of rotatable armatures adapted to coöperate to produce a high torque, one of which, when driven, is adapted to act as a generating armature, a pair of series field coils arranged in a line between said armatures for supplying flux thereto in parallel paths, a shunt wound coil practically ineffective at certain stages of operation but adapted to supply useful flux during generating operations, and a series coil connected to said shunt coil but wound differentially thereto whereby to limit the current output of said machine.

6. In a dynamo electric machine, a pair of rotatable armatures arranged on parallel shafts, a field frame having a pair of pole pieces arranged in a line between said armatures, said pole pieces being provided with series wound coils whereby to direct flux through said armatures, said field frame having a third pole piece, said third pole piece being provided with a series winding and a shunt winding responsive to the voltage developed across one of said armatures, the windings on said third pole piece being differentially wound whereby the current output of the machine is held to a safe value.

7. In a dynamo electric machine, a pair of rotatable armatures, means for directing flux through said armatures in parallel paths whereby said armatures may be caused to rotate, means for supplying flux to one of said armatures, and means opposing said flux supplying means, said opposing means having an effect proportional to the current output of said machine when acting as a generator.

8. In a dynamo electric machine, a pair of rotatable armatures adapted to coöperate as motor armatures but only one of which is adapted to be rotated as a generator armature, series field coils for supplying flux to said armatures for motoring, a shunt coil for supplying flux to said one armature for generating, and a third series field coil adapted, during generating, to oppose the effect of said shunt coil.

9. In a dynamo electric machine, a pair of rotatable armatures adapted to coöperate as motor armatures but only one of which is adapted to be rotated as a generator armature, series field coils for supplying flux to said armatures for motoring, a shunt coil for supplying flux to said one armature for generating, and a third series coil connected in series with said first mentioned series coils, all of said series coils being adapted, during generating, to oppose the effect of said shunt coil.

10. A dynamo electric machine having two armatures with their axes in different planes, a field magnet frame having field poles in an intermediate plane, series coils for energizing said field poles, whereby said armatures will form parts of parallel flux paths, and a third pole piece constituting part of one of said paths, said third pole piece being provided with differentially wound series and shunt coils.

11. A dynamo electric machine having two armatures adapted to coöperate to produce a high torque when motoring but only one of which is adapted to operate as a generating armature, means adjacent both armatures for supplying flux thereto for motoring, means adjacent to only one of said armatures to supply flux thereto for generating, and opposing means to said last mentioned means responsive to current output of said machine.

12. In dynamo electric machinery, in combination, a pair of rotatable armatures, means including series field coils for supplying flux to said armatures, a shunt coil for supplying flux to one of said armatures, a series coil connected with said shunt coil, said series coil being wound to oppose the effect of said shunt coil during certain stages of operation.

13. In dynamo electric machinery, in combination, a pair of rotatable armatures adapted to coöperate as motor armatures but only one of which is adapted to be rotated as a generator armature, series field coils for supplying flux to said armatures for motoring, a shunt coil for supplying flux to said one armature for generating and another series field coil adapted, during generating, to oppose the effect of said shunt coil.

In witness whereof, I have hereunto subscribed my name.

THOMAS R. DU BOIS.